Feb. 24, 1970  W. G. PORTER ET AL  3,496,818
GUIDE BUSHING FOR DIE SETS
Filed Sept. 11, 1967  2 Sheets-Sheet 2
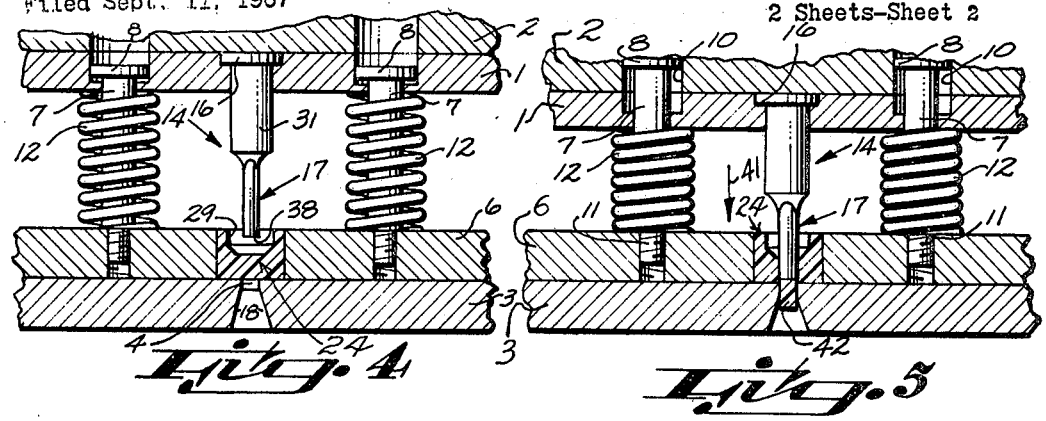
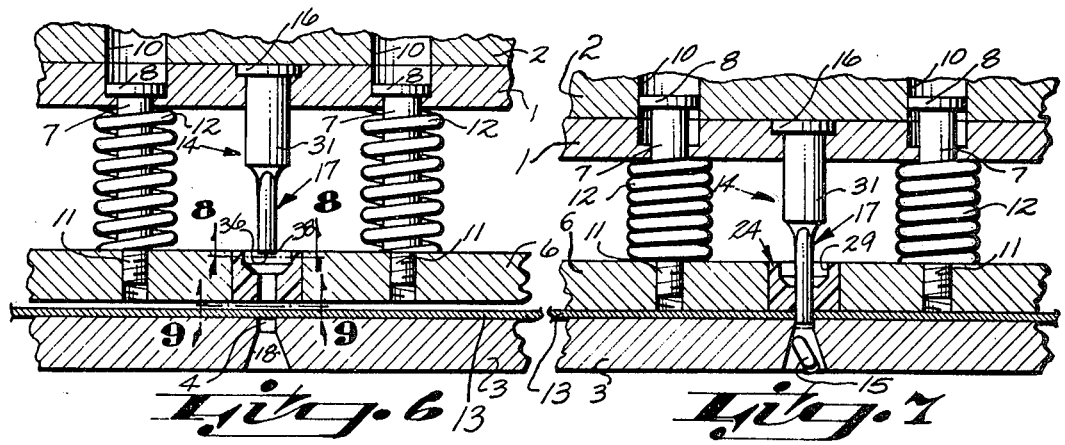
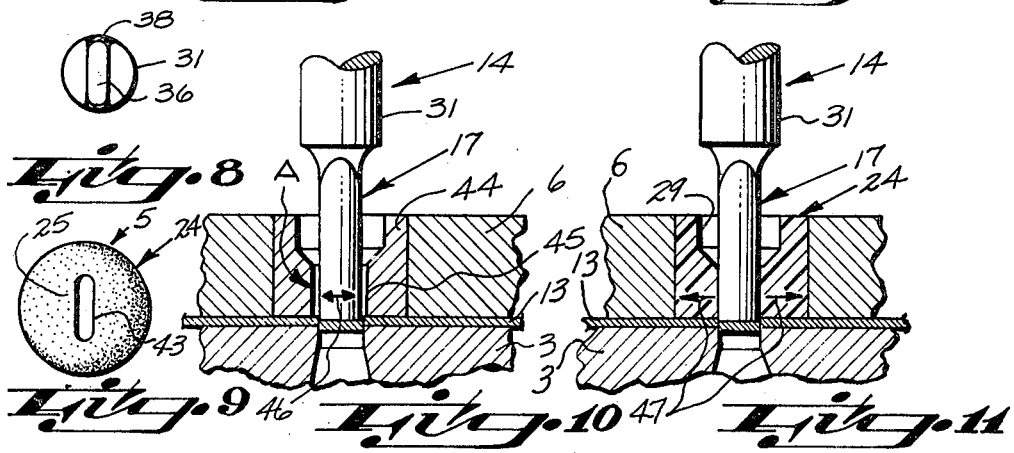
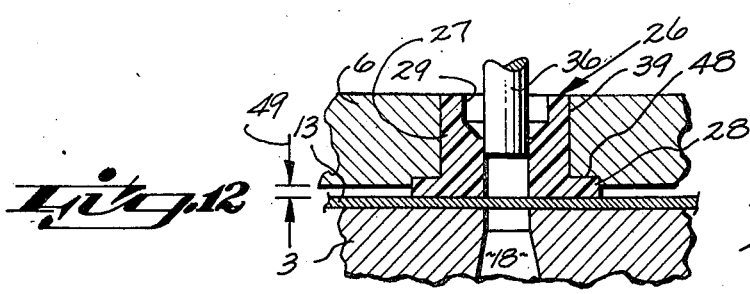
INVENTOR.
Walter G. Porter
Verner H. Stroh
Wood, Herron & Evans
ATTORNEYS

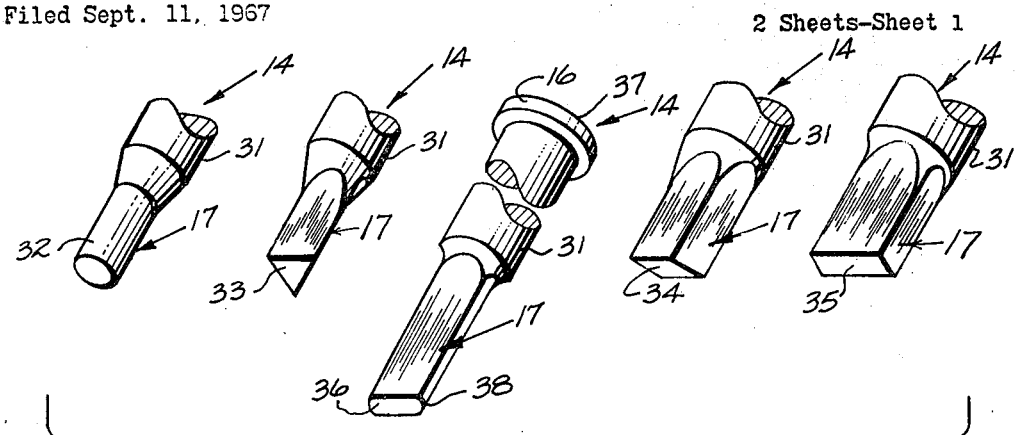
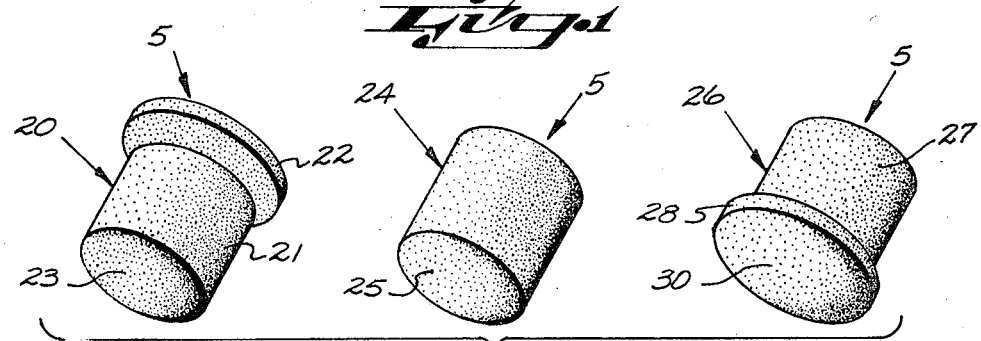
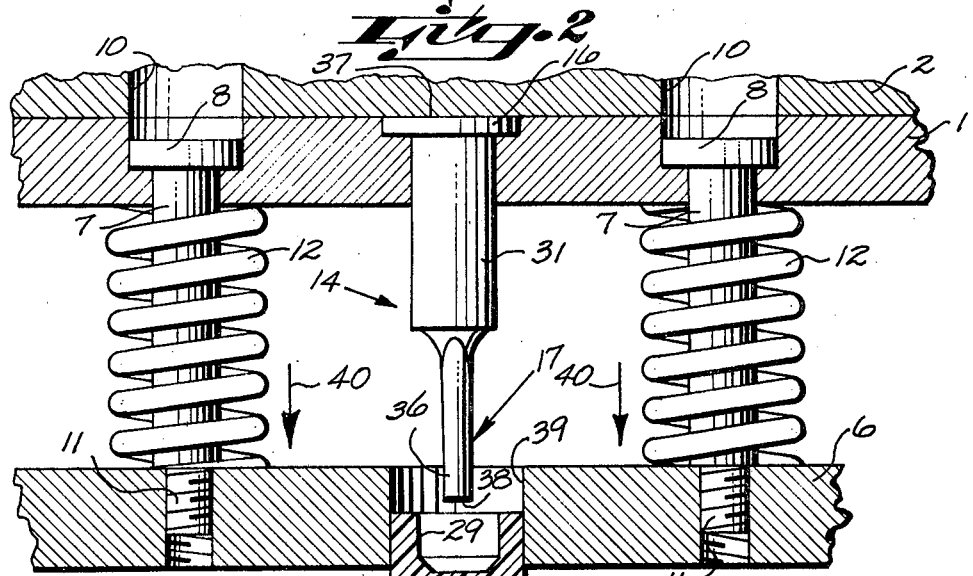

United States Patent Office

3,496,818
Patented Feb. 24, 1970

3,496,818
GUIDE BUSHING FOR DIE SETS
Walter G. Porter and Werner H. Stroh, Cincinnati, Ohio, assignors to Porter Precision Products, Inc., Cincinnati, Ohio, a corporation of Ohio
Filed Sept. 11, 1967, Ser. No. 666,607
Int. Cl. B26f 1/14
U.S. Cl. 83—140    12 Claims

ABSTRACT OF THE DISCLOSURE

A cylindrical guide bushing for a die set consisting essentially of a punch plate supporting one or more piercing punches in which the guide bushing is formed of a non-metallic, tough plastic material having a limited degree of yieldability and in which the cylindrical body of the guide bushing is press-fitted into a stripper plate. The plastic guide bushing includes a blank end wall which is pierced by the punch after the bushing has been press-fitted into the bore of the stripper plate so as to provide a precise guide bore slidably embracing the piercing end of the punch. A die plate is mounted below the stripper plate to support the workpiece below the stripper plate and its guide bushing during the punching operation.

---

This invention relates generally to die sets which are mounted in punch presses for piercing holes or hole patterns in sheet metal workpieces; the invention is directed in particular to improvements in the guide bushing through which the piercing or nib end of the punch passes during the punching stroke.

OBJECTIVES OF THE INVENTION

One of the primary objectives of the invention has been to eliminate much of the time and expense of machining steel guide bushings by providing a guide bushing which is fabricated from a non-metallic yieldable material capable of being punched, such as polyurethane press-fitted into the steel stripper plate, whereby the stripper plate confines the bushing against expansion and adapts it to be pierced by the punch with which it mates in piercing the work. The invention thus involves both method and apparatus aspects, that is, the use of non-metallic material in combination with steel, and also the method of assembly.

In press-fitting the blank bushing and thereafter, of piercing its guide bore according to the invention, the die set, consisting of the die plate, punch, punch backing plate, stripper plate, and stripper springs, is first assembled then installed relatively between the ram and platen of the punch press. The guide bushing, in blank form, is then press-fitted into the stripper plate by lowering the ram and stripper plate under hand control relative to the bushing; thereafter, the guide bore is formed in the press-fitted bushing by forcing the punch through the bushing, also by hand control of the press.

This procedure eliminates the necessity of precisely aligning the guide bushing, as is practiced in conventional die sets having steel guide bushings, and thus simplifies the assembly and set-up procedures.

A further objective has been to provide an improved method of fabricating a guide bushing whereby a non-metallic bushing is pierced by the nib of the punch with which it mates so as to provide a precise fit with reference to piercing nibs of different cross sectional configurations, such as cylindrical, square, oblong, triangular and other forms. This method eliminates machining which is particularly costly with reference to steel bushings for irregularly shaped piercing nibs, thereby decreasing the time and expense in setting up the die press for a given run of production.

A further objective has been to provide a guide bushing confined under pressure, in which the pierced guide bore embraces the lower working portion of the punch in pressure bearing engagement, particularly in the critical area surrounding the shearing end of the punch, causing the portion of the bushing immediately surrounding the nib to be forced under pressure against the work surface to improve the punching action and also causing the bushing to absorb shock-vibration forces which otherwise act upon the punch at the moment of shear, that is, as the punch penetrates the workpiece, thereby preserving the life of the punch.

A further advantage in the use of polyurethane arises from the fact that the material has no affinity for steel and hence, even though closely embracing the piercing end of the punch, requires no lubrication, as does a steel bushing, nor does it produce a wearing or galling effect.

To summarize, the use of material which is capable of being processed by the piercing nib of the punch with which it mates, provides many practical advantages over the use of steel guide bushings, some of which are listed below:

First, the polyurethane guide bushing and the method of mounting it in the stripper plate simplifies the assembly of the die set and improves alignment, in that the piercing nib of the punch, in forming its own guide bore, aligns the guide bore precisely and in a positive automatic manner with the piercing nib.

Secondly, the use of the improved guide bushing makes it possible to provide a precise fit with reference to the piercing nibs of different geometric cross sectional configurations by a simple piercing operation; moreover, the entire periphery of the piercing nib is in pressure bearing engagement with the surface of the guide bore of the bushing for precise alignment during prolonged operation of the die set.

Thirdly, the use of the rigidly confined non-metallic yieldable guide bushing produces an improved punching action in that the lower surface of the yieldable bushing, which contacts the upper surface of the workpiece under pressure during the piercing stroke, preserves the work area surrounding the piercing nib of the punch from surface damage.

While it is believed that various non-metallic materials may have the physical properties suitable for use as guide bushings according to the invention experimental work has indicated that polypurethane material in a range of hardness of approximately 75 Shore D appears to be best suited. This material has a high degree of tensile strength, impact resistance and also a degree of resilience and flowability best suited for its intended use. By way of example, a polyurethane material having these physical properties is manufactured and sold under the trade name "Flex-i-cast Urethane," and is referred to in this specification and in some of the claims as "urethane."

The blank guide bushings may be furnished to the user in cylindrical form and in a given range of diameters, with a cylindrical counter-bore or relief formed in an upper end portion, the lower end portion being left blank for the nib piercing operation. The bushings may be fabricated either by molding in suitable forming dies or they may be machined, utilizing the same methods as are applied in the machining of metallic bushing.

The various features and advantages of the invention will be apparent to those skilled in the art from the following detailed description in conjunction with the drawings.

In the drawings:

3

FIGURE 1 illustrates a group of punches having piercing nibs of several selected typical geometric configurations with which the blank urethane guide bushings may be pierced in practicing the invention.

FIGURE 2 illustrates several types of blank guide bushings formed of urethane for use with punches selected from the group shown in FIGURE 1 or with punches of other geometric configurations.

FIGURE 3 is a fragmentary sectional view showing the assembly procedure in which the blank urethane guide bushing is pressed into the stripper plate of a die set which is mounted in a punch press, utilizing the punch press, under hand control, to force the guide bushing into its bore in the stripper plate.

FIGURE 4 is a fragmentary sectional view showing the die set of FIGURE 3 on a reduced scale after the guide bushing has been pressed into the stripper plate.

FIGURE 5 is a fragmentary view similar to FIGURE 4, showing the procedure of forcing the piercing nib of a selected punch under hand control through the blank end portion of the urethane guide bushing to form the contact guide bore through the bushing.

FIGURE 6 is a view similar to FIGURE 5, showing the die set after completion of the blanking stroke of FIGURE 5, with a sheet metal workpiece in position to be pierced.

FIGURE 7 is a view similar to FIGURE 6, showing the punch at the limit of its downward piercing stroke, with the nib of the punch forced through the workpiece to form the aperture.

FIGURE 8 is an end view of the piercing punch as viewed along the line 8—8 of FIGURE 6.

FIGURE 9 is an end view along line 9—9 of FIGURE 6, showing the headless blank urethane guide bushing after having been pierced.

FIGURE 10 is an enlarged fragmentary sectional view of a die set utilizing a conventional metal guide bushing, with the nib clearance shown in a magnified scale for purposes of illustration. This view is intended to show the disruptive shock vibration forces which act upon the piercing nib at the moment of impact or shear.

FIGURE 11 is a diagrammatic sectional view similar to FIGURE 10, showing the piercing nib at the moment of impact with the use of the non-metallic urethane guide bushing of the invention, whereby the shock-vibration forces are inhibited by and absorbed into the urethane bushing by virtue of its pressure contact with the nib.

FIGURE 12 is a fragmentary sectional view generally similar to FIGURE 11, showing the head-down bushing of FIGURE 2 installed in press-fitted engagement with the stripper plate and showing the protective effect of the head of the guide bushing with respect to the finished top surface of a sheet metal workpiece.

DIE SET GENERALLY

As noted, the non-metallic urethane guide bushing of the invention is intended to be mounted within the steel stripper plate of a convenional die set in place of the steel guide bushings ordinarily used. The die set, in turn, is mounted in a punch press (not shown) which consists essentially of a rigid frame having a stationary platen and a reciprocating ram.

The die set shown in FIGURES 3–7 essentially comprises a punch plate 1 which is mounted upon the backing plate 2, which, in turn, is secured upon the ram of the press. The die plate 3 is mounted upon the stationary platen of the press and includes a die or piercing hole 4 for each punch. The nib end of the punch, indicated generally at 17, passes through the die hole 4 during the punching stroke and pierces the sheet metal workpiece which is placed upon the die plate 3 when the ram is elevated.

The urethane guide bushing of this invention is indicated generally at 5 and is press-fitted into the stripper plate 6. The stripper plate is mounted with reference to the punch plate 1 by keeper screws 7, each screw having a head 8 at its upper end slidably confined within a counter bore 10 common to the punch plate 1 and backing plate 2. The lower end of each keeper screw includes a threaded portion 11 which is screwed into the stripper plate 6. Each keeper screw 7 includes a stripper spring 12 confined in compression between punch plate 1 and stripper plate 6.

At the start of the punching stroke (FIGURE 6), the stripper plate 6 shifts downwardly in unison with the punch plate 1 by operation of the keeper screws 7 and stripper springs 12, with the nib of the punch retracted above the guide bushing 5. When the stripper plate 6 engages the sheet metal workpiece 13 (FIGURE 7) the punch plate 1 overtravels the stripper plate 6, thus compressing the stripper springs 12 and forcing the stripper plate 6 under pressure against the workpiece 13 to clamp the workpiece. As the stripper springs 12 are compressed, the punch, indicated generally at 14, is forced downwardly through the guide bushing 5 and through the workpiece 13 so as to shear a slug 15 (FIGURE 7) from the workpiece.

At completion of the piercing or punching stroke, the ram of the press ascends so as to withdraw the punch from the workpiece. During the upward motion of the die plate 1 and backing plate 2, the compressed stripper springs 12 holds the stripper plate 6 under pressure against the workpiece resting on the die plate 3 while the punch 14 is withdrawn from the workpiece 13 and from the guide bushing 5.

For withdrawal, the upper end of the punch 14 is provided with a head 16 seated in a counterbore formed in in the punch plate 1, the head 16 of the punch being seated against the backing plate 2. The upward withdrawal motion continues until the piercing nib or point 17 of the punch is clear of the guide bushing 5, while the expanding stripper springs 12 continue to hold the stripper plate 6 in pressure engagement with the sheet metal workpiece 13. As the lower end of the piercing nib clears the upper end of the guide bushing 5, the stripper springs 12 will have reached a point approaching their fully expanded condition shown in FIGURE 6, at which point, the heads 8 of the kepeer screws 7 will have engaged the lower ends of their counterbores 10. Thereafter, the relationship of the piercing nib end of punch 14 and stripper plate 6 remains constant as the die set rises with the ram to the upper limit of its stroke.

It will be understood that the die set usually is provided with multiple punches and guide bushings, the punches being accurately located to punch a precise pattern of holes in the workpiece upon each punching stroke. It will also be understood that the several keeper screws 7 and stripper springs 12 are located on centers as required by the number and relative positions of the several punches. Pilot pins or dowels (not shown) usually pass upwardly from the stripper plate 6 and through the punch plate and backing plate to hold the stripper plate and its guide bore precisely in registry with the nib portion of the punch.

In the present disclosure, the piercing hole 4 is formed directly in the die plate, such that the upper edge of the die hole 4 forms a shearing edge coating with the shearing edge of the nib 17 of the punch. It will be understood that the configuration of the piercing hole corresponds with the shape or configuration of the piercing nib. As best shown in FIGURE 3, the piercing hole 4 includes an outwardly tapered slug discharge section 18 below the piercing portion 4 to provide clearance for the severed slug 15 as it drops downwardly by gravity after having been severed.

In other instances, the die plate may be provided with a die button (not shown), formed of hardened steel and seated in a bore formed in the die plate. The die button is provided with a piercing hole corresponding to the nib of the punch, the given sizes and shapes of buttons and punches being furnished in matched sets by the supplier.

GUIDE BUSHINGS

The several typical forms of guide bushings indicated at 5 in FIGURE 2 are found of urethane, having the physical properties defined earlier. The types shown, consisting of head-up, headless and head-down bushings are conventional in the industry and are fabricated from steel and furnished to the user with matching punches. In steel punch and bushing sets, according to conventional practise, the guide hole of the bushing necessarily is machined to interfit the nib of the punch with which it mates.

However, the guide hole in the steel bushing cannot be machined to fit the nib with metal-to-metal precision, since some running clearance must be provided to prevent galling of the metal surface and for lubrication. On the other hand, the presence of running clearance, although slight, does lead to a limited amount of lateral freedom of the nib, which is reflected in the hole punching accuracy.

In the use of the metal guide bushings, the punch is subjected to shock vibration forces which act along the longitudinal axis of the punch and also laterally with reference to the nib at the point of impact or shear during the punching stroke, as indicated earlier. The urethane bushing, by virtue of its pressure contact bearing about the periphery of the nib, and by reason of its inherent resiliency, inhibits and absorbs; the shock vibrations which are developed at the point of impact, and thus preserves the life of the punch. Moreover, due to the physical characteristics of the urethane material, which has no affinity to metal, there is no problem of wear or galling and there is no need for lubrication even though a close fit is provided.

The problem of providing precisely fitted metal guide bushings becomes a great deal more critical in the use of punches having nibbed cross sections of geometric shapes other than cylindrical, as indicated in FIGURE 1. The urethane bushing, which is pierced by the same punch with which it mates, makes it possible to provide guide bores of any cross sectional shape without machining and fitting difficulties.

A further advantage arises from the fact that the contact bearing about the nib, due to the slight yieldability of the urethane, provides pressure engagement with the work surface at the point of shear in an area immediately surrounding the nib. This action has been found to improve the quality of the work and to inhibit damage to the work surface.

It will be understood that the several advantages outlined are brought about by the fact that the urethane bushing is used in combination with the steel stripper plate. In other words, the most desirable qualities of this material in its use as a guide bushing, are derived from the fact of confining the bushing under pressure within the bore of the stripper plate or an equivalent element.

The urethane guide bushing indicated generally at 20 (FIGURE 2) is of the head-up type, comprising a cylindrical body 21 having a head 22 and a blank end portion 23 through which the guide bore is pierced. The head-up punch 20 is installed in the stripper plate with the head 22 seated on the upper surface of the stripper plate 6 and with the body portion 21 pressed into the bore in the stripper plate, as explained later.

The guide bushing indicated generally at 24 is of the headless type and includes a blank end portion 25. This is the type selected for illustration in the drawings. In this case the body of the guide bushing is also press-fitted in the bore of the stripper plate, the cylindrical body of the bushing providing an interference or force fit with respect to its bore, the method of installation being explained later.

The guide bushing indicated generally at 26 is of the head-down type, comprising a body portion 27 and a head 28. In this instance the blank portion 30 is that area adjacent to and including the head. In installing the head-down bushing, the lower portion of the stripper plate is counter-bored to a depth less than the thickness of the head 28, such that the lower surface is displaced in a plane slightly below the plane of the stripper plate (FIGURE 12), such that the surface of the head engages the surface of the workpiece to prevent marring of the work surface, as explained later with reference to FIGURE 12.

The several guide bushings 20, 24 and 26 are each provided with a recess or relief bore 29 in the area opposite the solid section through which the piercing nib or punch is forced. The relief bores 29 may be of any desired configuration in cross section, the purpose of the recess being to limit the area through which the piercing nib passes. In some instances, the recess may be omitted entirely.

PIERCING PUNCHES

Each of the several typical piercing punches disclosed in FIGURE 1 and indicated generally at 14 comprises a punch body 31 having a head 16 at its upper end, as previously described, and a piercing nib or point 17 at its lower end, also referred to previously. It will be understood that the several nibs illustrated are related in size to recess 29 of the guide bushing through which the nib passes. It will also be understood that cross sectional dimension of the various nib types is selective, punches having a given body diameter being furnished in a series of nib sizes for use with a guide bushing having a mating recess diameter. One of the typical punches illustrated in FIGURE 1 includes a cylindrical nib portion 32 intended for punching circular holes in the workpiece. The triangular nib 33 and the diamond-shaped nib 34 and the rectangular nib 35 are intended to be used in punching workpieces which require hole patterns of the configuration illustrated. The oblong nib 36 has been selected for illustrating the invention in the several views, the guide bore of the punched guide bushing being shown in FIGURE 9.

In a given punch size, the overall length, that is, the dimension from the top surface 37 of the head 16 (FIGURE 3) to the shearing end 38 of the nib is constant. Accordingly, the ends 38 of all punches of a given die set normally reside in a common plane with reference to the upper portion of the guide bushing in the initial position of the stripping plate 6 as controlled by the keeper screws 7 (FIGURE 3).

MOUNTING PROCEDURE

Headless bushing

The headless bushing 24 is press-fitted into the bore 39 of the stripper plate 6 (FIGURE 3), by forcing the bushing under pressure from the bottom of the stripper plate upwardly. This operation is carried out with the die set in assembled condition and mounted on the ram of the press. During press-fitting, the movement of the ram is controlled by hand, preferably utilizing the power unit of the press in developing the pressure.

In the mounting operation, the ram, with die set mounted on it, is elevated a sufficient distance above the die plate 3 to permit the guide bushing to be aligned with and insested by hand partially into the bore 39, the bore diameter and outside diameter of the bushing being finished to tolerances which provide a controlled press fit with its bore. With the bushing thus aligned with its bore, the ram is lowered under hand control so as to bring the stripper plate downwardly as indicated by the arrows 40 in FIGURE 3.

As the punch plate 1 is forced downwardly by the ram, the compression force is transmitted from the punch plate 1 through the stripper springs 12 to the stripper plate 6, the resistance of the springs being sufficient to force the stripper plate 6 downwardly as the bushing 5 is press-fitted. During this operation, the position of the shearing end 38 of nib 17 remains constant with reference to the stripper plate 6, as shown in FIGURE 3.

At completion of the press-fitting operation (FIGURE 4), the lower surface of the headless guide bushing 5 preferably is flush with the lower surface of the stripper plate 6, with the lower end portion of nib 17 projecting immediately above or into the preformed recess 29 of bushing 5. The lower blank end portion 25 (FIGURES 3 and 4) of bushing 5 is pierced to the configuration of the nib.

After the bushing has been seated, the ram of the press is again forced downwardly under hand control, as indicated by the arrows 41 in FIGURE 5, thus forcing the die set downwardly until the stripper plate 6 again engages the top surface of the die plate 3. Continued downward motion thereafter compresses the stripper springs 12, thus forcing the nib portion (oblong shape 36 in this example) downwardly through the blank end portion 25 of the bushing, thus piercing the bushing to a configuration corresponding precisely to nib 36 and providing a pressure contact fit about the nib.

During this operation, the shearing edge of the piercing hole 4, coacting with the shearing edge 38 of the nib, severs the urethane slug 42 (FIGURE 5) which is discharged downwardly through the slug discharge opening of the die plate 3. At completion of the blanking operation, the die set is ready for use.

In the example illustrated in FIGURES 3–7, the bushing 5 will have been pierced to provide an oblong guide bore 43 (FIGURE 9) corresponding precisely with the configuration of the oblong nib 36 shown in FIGURE 8. As noted above, the guide piercing procedure eliminates the time and expense which is ordinarily involved in machining a guide bore of irregular configuration. The guide bore thus provided is precisely aligned with the nib even though some misalignment may have been present between the axis of the bushing and the axis of the punch nib. The guide piercing procedure and the use of the urethane or equivalent material has the further advantage of providing a pressure bearing contact with the entire periphery of the piercing nib without regard to the particular configuration of the punch.

After the guide bore has been formed, the die set is ready for production as shown in FIGURES 6 and 7. At the beginning of each working cycle, the ram is elevated so as to raise the die set above the punch plate a sufficient distance for insertion of the sheet metal workpiece 13 (FIGURE 6). During the working stroke (FIGURE 6) the die set is lowered until the stripper plate engages the workpiece 13 and during continued downward movement, the stripper springs 12 begin to compress between the punch plate 1 and stripper plate 6, causing the nib 36 to pass downwardly through the guide bore as previously formed in the bushing 5. This relative motion (with the bushing under pressure bearing contact about the nib) continues until the shearing end of the nib engages the workpiece, at which point compression force builds up in the nib and body of the punch until the metal slug 15 is sheared from the workpiece, as indicated in FIGURE 7. The slug discharges by way of the slug passageway 18. As the die set is retracted for the next working stroke, the workpiece 13 is held in place and stripped from the nib by the stripper plate 6 through operation of the stripper springs 12.

In order to illustrate the advantages of the use of the urethane bushing and the method of installing it, as explained earlier, the essential parts of a conventional die set are illustrated in FIGURE 10 and the corresponding parts of the urethane combination are illustrated in FIGURE 11. In FIGURE 10, the conventional metal guide bushing is indicated at 44 mounted in relation to a stripper plate 6. The conventional running clearance between the nib 36 and the bore 45 of the bushing is indicated on an enlarged scale at A in FIGURE 10. This clearance is necessary to provide a running fit and to prevent galling of the relatively moving surface of the bore and nib 36 and also to allow for the minor variations in alignment of the parts. The shock-vibration forces which are developed in the nib at the moment of shear are indicated by the arrow 46 in FIGURE 10, and as indicated, are not inhibited by the guide bushing.

In the use of the urethane bushing, as indicated in FIGURE 11, the blanking operation by the nib 36 itself provides a pressure bearing about the periphery of the nib, as noted previously. By virtue of the relative yieldability of the urethane material and the bearing contact pressure between the bore and nib surface, the shock-vibration forces at the moment of shear are absorbed by the bushing, as indicated by the arrows 47 in FIGURE 11.

Head-up bushing

The head-up bushing 20 is press-fitted into the stripper plate 6 from above, so that the head resides above the top plane of the stripper plate. In view of this, the bushing 20 is installed in the stripper plate before the punch plate 1, backing plate 2, and die plate 3 are assembled. After the press-fitting operation, the die set is assembled in the punch press, and the guide piercing operation is carried out as described above with reference to FIGURES 4 and 5. The press-fit of the body 21 of the head-up bushing is sufficiently tight to hold the bushing in the stripper plate during the withdrawal movement of the punch.

Head-down bushing

The head-down bushing 26 is installed from the lower surface of the stripper plate 6 in the same manner as described with reference to the headless bushing 24 (FIGURES 3 and 4). In other words, the bushing is placed upon the die plate 3 with its head 28 resting upon the die plate. The body 27 of the head-down bushing is then press-fitted in the stripper plate 6 by hand control of the punch press. Thereafter, the guide hole is pierced in the punch, also under hand control of the press.

As shown in FIGURE 12, the bore 39 of the stripper plate is counter-turned as at 48 to receive the head 28, with the exposed surface of the head displaced in a plane below the surface of the stripper plate. This displacement is indicated on a magnified scale at 49.

The head-down urethane bushing, installed as indicated, is of particular advantage in punching sheet metal workpieces which have a finished top surface, such as enamel, which must be preserved. Thus (FIGURE 12) during the punching stroke, the relatively yieldable surface of the urethane head is seated in pressure engagement with the finished top surface of the workpiece in a circular area surrounding the piercing hole 4 of the die plate 3. As the nib shears the workpiece any burr which may result is apparent on the lower or unfinished surface of the workpiece while the finished upper surface is protected by the surface of the urethane head 28 which prevents engagement with the work surface by the steel stripper plate 6.

Having described our invention we claim:
1. A guide bushing for a die set which includes a punch having a piercing nib, a die plate adapted to support a sheet metal workpiece and having a die hole to receive the piercing nib, and a stripper plate disposed between the nib and die plate, the stripper plate having a cylindrical bore for seating said guide bushing, said guide bushing comprising:
   a cylindrical body formed from a relatively tough plastic material which is substantially incompressible and which has a limited degree of yieldability;
   said cylindrical body having a diameter sufficiently larger than the bore of the stripper plate to provide an interference fit with said bore, adapting the cylindrical body to be press-fitted into the said bore;
   said bushing having a blank wall portion adapted to be pierced by the nib of the punch after the body of the bushing has been press-fitted into the bore of the stripper plate;

said blank wall portion, upon being pierced by said nib, providing a guide bore for slidably embracing the nib in pressure contact about the entire periphery of the nib.

2. A guide bushing as set forth in claim 1 in which the guide bushing is formed of a urethane material having a hardness range between 50 Shore A and 75 Shore D.

3. A guide bushing as set forth in claim 1 in which a recess is formed in one end portion of the bushing and extends longitudinally along the axis of the bushing to a plane intermediate the length of the bushing, the opposite end portion of the bushing having a blank wall portion which is adapted to be pierced by the nib of the punch after the body of the bushing has been press-fitted into the bore of the stripper plate, thereby to provide a guide bore for the nib which slidably embraces the nib in pressure bearing contact about the entire periphery of the nib.

4. A guide bushing as set forth in claim 1 in which the blank wall portion of the bushing includes a head having a diameter greater than the cylindrical body of the bushing, said head adapted to be disposed on the side of the stripper plate adjacent the die plate, the outer surface of the said head being displaced outwardly from the surface of the stripper plate when the bushing is press-fitted therein, the surface of the head adapted to engage the surface of a sheet metal workpiece resting upon the die plate during a piercing stroke.

5. A guide bushing as set forth in claim 1 in which the guide bushing is formed of a relatively tough plastic material which is substantially incompressible and which has a limited degree of yieldability, one end portion of the bushing having a recess formed therein, the diameter of the recess being greater than the diameter of the punch and extending longitudinally of the bushing for a distance not greater than one-half the length of the bushing, the opposite end portion of the bushing having a guide bore formed therein, the diameter of which is equal to the diameter of the nib and adapted to provide a pressure contact bearing engagement about the entire periphery of the nib for guiding the piercing nib axially relative to the die hole of the die plate.

6. A combined stripper plate and guide bushing for a die set adapted to be mounted in a punch press, said die set having a punch including a piercing nib, a die plate adapted to support a sheet metal workpiece, said die plate having a die hole for receiving said piercing nib during a piercing stroke, said combined stripper plate and guide bushing comprising:

a stripper plate formed of metal and disposed between the nib and the die plate, the stripper plate having a cylindrical bore;

a guide bushing formed of a relatively tough plastic material which is substantially incompressible and which has a limited degree of yieldability;

said bushing having an outside diameter which normally is sufficiently greater than the diameter of the bore of the stripper plate to provide an interference fit therewith;

said guide bushing being press-fitted into the guide bore of the stripper plate and confined under pressure therein;

one end portion of the bushing having a blank wall portion adapted to be pierced by the nib after the guide bushing has been press-fitted into the bore of the stripper plate.

7. A combined stripper plate and guide bushing as set forth in claim 6 in which one end portion of the bushing has a guide bore therein corresponding to the cross-sectional configuration of the piercing nib and embracing the periphery of the nib in pressure bearing engagement, said guide bore providing a sliding engagement with the nib, thereby to guide the nib in alignment with the die hole of the die plate during a piercing stroke.

8. A combined stripper plate and guide bushing as set forth in claim 7 in which the end portion of the guide bushing is substantially flush with the surface of the stripper plate, the guide bore of the bushing providing a sliding frictional engagement with the nib of the punch which is sufficient to displace the portion of the yildable guide bushing in the area surrounding the piercing nib during the piercing stroke, whereby said displaced area of the bushing is forced in pressure engagement against the surface of the workpiece surrounding the die hole during a piercing stroke, thereby clamping the workpiece under pressure against the die plate during the punching stroke.

9. A combined stripper plate and guide bushing as set forth in claim 7 in which the end portion of the guide bushing is substantially flush with the surface of the stripper plate, the guide bore of the bushing providing a sliding frictional engagement with the nib of the punch which is sufficient to displace the portion of the yieldable guide bushing in the area surrounding the piercing nib during the piercing stroke, whereby said displaced area of the bushing is forced in pressure engagement against the surface of the workpiece surrounding the die hole during a piercing stroke, thereby clamping the workpiece under pressure against the die plate during the punching stroke, said guide bushing having sufficient yieldability and embracing the piercing nib with sufficient pressure to absorb shock-vibration forces which are developed in the nib as the nib penetrates the workpiece in the moment of shear as the nib pierces the workpiece.

10. The method of producing a combined stripper plate and guide bushing for a die set having a punch including a piercing nib, said method comprising the following steps:

providing a stripper plate formed of metal and having a cylindrical bore adapted to receive a guide bushing;

providing a guide bushing formed from a relatively tough substantially incompressible plastic material which has a limited degree of yieldability and which is capable of being press-fitted and pierced;

said bushing having a blank portion and having an outside diameter sufficiently greater than the diameter of the cylindrical bore of the stripper plate to provide an interference fit therewith;

forcing said stripper plate and guide bushing together, thereby to press-fit the guide bushing into the cylindrical bore of the stripper plate;

and forcing the piercing nib of the punch through the blank portion of the guide bushing and thereby forming a guide bore in said bushing which corresponds the cross-sectional configuration of the piercing nib.

11. The method of producing a combined stripper plate and guide bushing for a die set having a punch including a piercing nib, said method comprising the following steps:

providing a stripper plate formed of metal and having a cylindrical bore adapted to receive a guide bushing;

providing a guide bushing formed from a relatively tough substantially incompressible plastic material which has a limited degree of yieldability and which is capable of being press-fitted and pierced;

said bushing having a blank portion and having an outside diameter sufficiently greater than the diameter of the cylindrical bore of the stripper plate to provide an interference fit therewith;

forcing said stripper plate and guide bushing together, thereby to press-fit the guide bushing into the cylindrical bore of the stripper plate, said interference fit providing sufficient pressure to confine the guide bushing within the bore of the stripper plate;

and forcing the nib of the punch through the blank portion of the guide bushing after the bushing has been press-fitted into the cylindrical bore of the stripper plate and thereby forming the cross-sectional configuration of the piercing nib.

12. The method of producing a combined stripper plate and guide bushing for a die set having a punch including a piercing nib, the die set having a die plate including a die hole interfitting the piercing nib for receiving the nib, said method comprising the following steps:

providing a stripper plate formed of metal and having a cylindrical guide bore adapted to receive a guide bushing;

providing a guide bushing formed from a relatively tough substantially incompressible plastic material which has a limited degree of yieldability and which is capable of being press-fitted and pierced;

said bushing having a blank portion and having an outside diameter sufficiently greater than the diameter of the cylindrical bore of the stripper plate to provide an interference fit therewith;

placing said blank guide bushing on said die plate in axial alignment with the cylindrical bore of the stripper plate and in axial alignment with the die hole of the die plate;

forcing said stripper plate toward the guide bushing which is resting upon the stationary die plate, thereby to press-fit the the guide bushing into the cylindrical bore of the stripper plate, said interference fit providing sufficient pressure to confine the guide bushing against expansion within the bore of the stripper plate;

and forcing the nib of the punch through the blank portion of the guide bushing and into the die hole of the die plate after the bushing has been press-fitted into the cylindrical bore of the stripper plate, thereby forming a guide bore in said bushing which corresponds to and embraces the cross-sectional configuration of the piercing nib, the guide bushing thereby providing a guide bore which is aligned with the axis of the piercing nib and with the axis of the die hole.

References Cited

UNITED STATES PATENTS

| | | | |
|---|---|---|---|
| 3,125,917 | 3/1964 | Smeets | 83—140 |
| 3,234,835 | 2/1966 | Archbold et al. | 83—139 |

FOREIGN PATENTS 1,030,080   5/1966   Great Britain.

WILLIAM S. LAWSON, Primary Examiner

U.S. Cl. X.R.

76—107; 83—685